INVENTOR.
Donald O. Gifford
BY C. A. Gulbrandsen
Atty.

Nov. 20, 1962 D. O. GIFFORD 3,065,309

ELECTRONIC TONE GENERATOR

Filed March 7, 1960 2 Sheets-Sheet 2

INVENTOR.
Donald O. Gifford
BY
C. A. Gulbrandsen
Atty.

3,065,309

ELECTRONIC TONE GENERATOR

Donald O. Gifford, Brockville, Ontario, Canada, assignor to Automatic Electric Laboratories, Inc., Northlake, Ill., a corporation of Delaware Filed Mar. 7, 1960, Ser. No. 13,293
4 Claims. (Cl. 179—84)

This invention relates to an electronic tone generator, and more particularly to an electronic signal tone generator for use in a small telephone exchange, such as a private automatic branch exchange.

The principal object of the invention is to provide a simple, inexpensive generator for supplying a satisfactory tone signal, for example dial tone, for use in a telephone exchange in which the load on the tone source is small.

Until recently in the telephone industry the equipment for supplying signal tones such as dial, busy, and ring-back tones comprised rotating electrical machinery. Electronic tone generators have been developed for supplying these tones, using circuits which provide output signals having waveforms which substantially duplicate the standard waveforms for these signals. Such generators are capable of supplying substantial amounts of power at good efficiency. However the known electronic tone generators use complicated circuitry and expensive components. To supply the modulated tones two or more oscillators are used, and the outputs thereof are combined in a separate mixing or modulating circuit. Therefore such generators become unduly complicated and expensive for use in an exchange in which only a few lines need be supplied with tone, such as in a PABX.

A large variety of electronic circuit arrangements are known for generating alternating-current signals; and depending upon the specific circuit arrangement, the output may have a waveform which is a sine wave, a square wave, or any of many others. One of the known circuit arrangements for square wave generation is the multivibrator. This arrangement usually comprises two amplying devices such as vacuum tubes or transistors with a cross coupling arrangement such that one of the devices is conducting while the other is cut off until a capacitor reaches a given charge, causing the circuit to quickly switch so that the device which was conducting becomes cut off and the other becomes conducting. The circuit may be adjusted to be astable or free-running so that it periodically alternates between the two conditions. It is also known to make the time constants in the two cross coupling circuits very unequal so that one device is conducting for a much longer interval than the other during each period. Such an arrangement has been used for example in pulse generators to supply short pulses with a relatively long interval between pulses. However, in telephone signal-tone generators in which multivibrators have been used, they have been of the symmetrical type and used to supply the lower frequency one of the two signals to a modulator. Such arrangements then also include a sine wave oscillator for supplying the high frequency input to the modulator. It is readily seen that such arrangements require at the minimum two oscillators, a modulator, and usually an amplifier. Such an arrangement is therefore complicated and expensive.

According to the invention, a simple and inexpensive tone generator is provided using an unsymmetrical free-running multivibrator in combination with an amplifier for supplying a modulated tone signal over a telephone line to the receiver in a subscriber subset. An audible tone is then produced by the receiver, the tone having the standard frequency components modulated together as required. The multivibrator comprises two amplifying devices with a cross coupling network having component values such that the time constants produce a basic period during which each of the devices is conducting for a single interval; the total period being equal to one complete cycle at the lower one of the two frequencies in the composite tone, and the shorter one of the conducting intervals being equal to one-half cycle at the higher of the two frequencies.

In one specific form of the invention, the amplifying devices are transistors with each of the collector and base electrodes connected through its own resistance to one of the terminals of a direct-current power source, with each of the base electrodes coupled through a capacitor to the collector electrode of the other transistor, and with the emitter electrodes connected to the other pole of the direct-current power supply. The time constants in the cross coupling networks are made unequal, specifically by making one of the cross coupling capacitors much larger than the other.

A transistor amplifier is coupled between the multivibrator and the output to the telephone lines. One arrangement for coupling the output of the multivibrator to the amplifier comprises a transformer with one end of the primary winding connected to a resistor and a capacitor in series to the collector electrode of one of the transistors, the other end of the primary winding being connected to the emitter electrode of that transistor.

The tone generator circuit begins to operate at once when power is applied. Therefore, according to a further feature of the invention, the connection to the power source is made through a switching device which is operated in response to a start signal. Thus the circuit is switched off when output is not required.

The above-mentioned and other objects and features of this invention and the manner of attaining them will become more apparent, and the invention itself will be best understood, by reference to the following description of embodiments of the invention taken in conjunction with the accompanying drawings comprising FIGS. 1 to 4 wherein.

Figure 1:
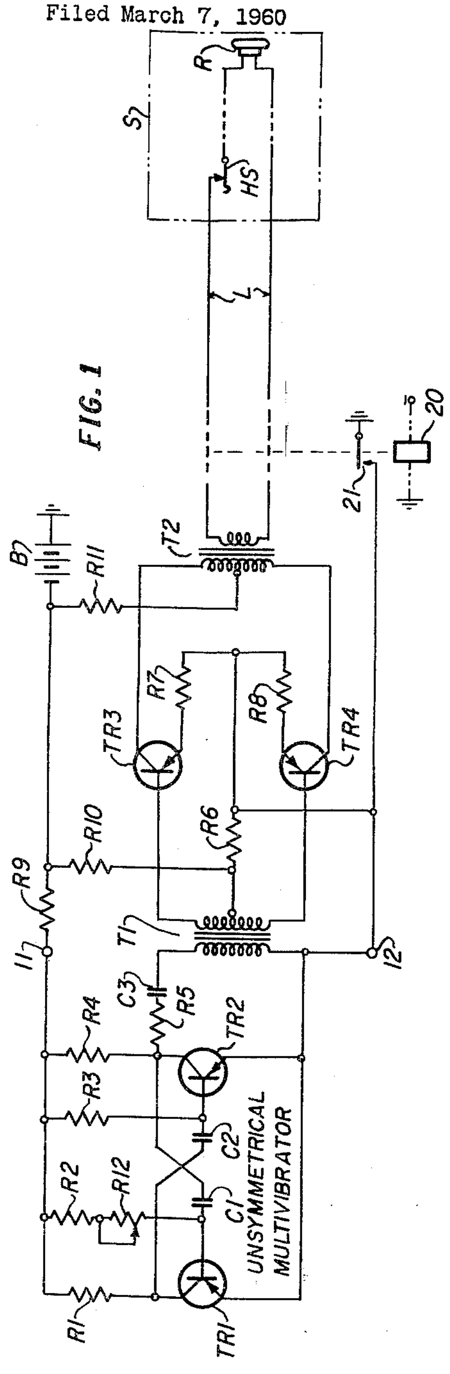
FIG. 1 is a schematic diagram of an embodiment of the invention.

Referring to FIG. 1, an exemplary embodiment of a tone generator according to the invention comprises a multivibrator using transistors TR1 and TR2, and a amplifier with transistors TR3 and TR4, for supplying a tone signal over a telephone line L to a telephone receiver R of a subset S. This unit may be used for example to supply dial tone, which according to telephone practice should be a modulated signal having 120-cycle-per-second and 600-cycle-per-second components.

Transistors TR1 and TR2 together with their associated resistors and capacitors form an unsymmetrical free-running multivibrator. The transistors, as well as those used in the amplifier, may be type 2N188A. A terminal 11 is connected through a resistor R1 to the collector of transistor TR1, through R2 and R12 to the base of transistor TR1, through resistor R3 to the base of transistor TR2, and through resistor R4 to the collector of transistor TR2. Resistors R1 and R4 may have values of 680 ohms each; resistors R2 and R3, 22,000 ohms each; and resistance R12 may be a 5,000 ohm potentiometer. The base electrode of transistor TR1 is connected to the collector electrode of transistor TR2 through a capacitor C1 having a value of 0.22 microfarad, while the base electrode of transistor TR2 is connected to the collector electrode of transistor TR1 through a capacitor C2 having a value of 0.05 microfarad. The emitter electrodes of the two transistors are directly connected to a terminal 12. Telephone exchanges are usually provided with a 48-volt battery B. Terminal 11 may be connected to the negative terminal of this battery through a dropping resistor R9 having a value of 2400 ohms, giving a potential at terminal 11 of approximately 9 volts. Terminal 12 may be connected to the grounded terminal of the battery through contacts 21 of a relay 20.

Figure 3:
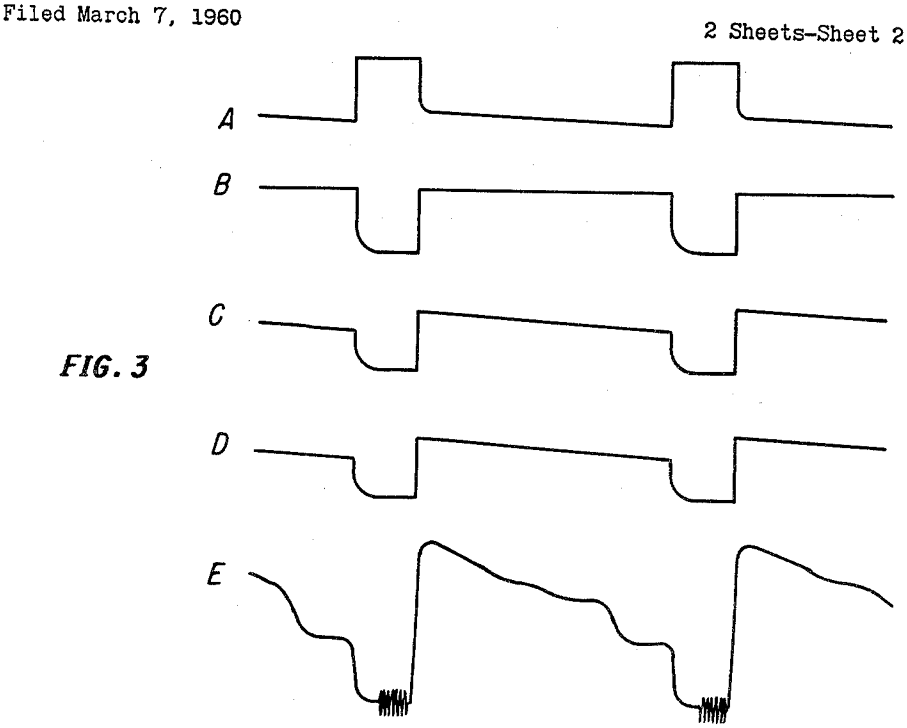
FIGS. 3 and 4 are graphs showing various waveforms of the respective embodiments.

With the circuit constants used, except for the cross coupling capacitors C1 and C2, each of the transistors TR1 and TR2 would operate at full conduction. With the coupling capacitors, the usual multivibrator switching action is obtained so that one of the transistors becomes full conducting and the other one is cut off. For example suppose transistor TR1 is cut off because of the charge on capacitor C1. Capacitor C1 then discharges through resistors R2 and R12 in series until the voltage at the base of transistor TR1 reaches a value which causes base-emitter current to flow. The current flow in transistor TR1 causes its collector voltage to drop, the change of potential is transmitted through capacitor C2 to the base electrode of transistor TR2, and the cumulative switching action causes transistor TR2 to be cut off while transistor TR1 comes to full conduction. Then capacitor C2 discharges through resistor R3 until base-emitter current begins to flow in transistor TR2 and the switching action reverses. The time interval during which transistor TR1 is cut off is governed by the time constant of capacitor C1 and resistors R2 and R12, while the time interval during which transistor TR2 is cut off depends on the time constant of capacitors C2 and resistor R3. With the constants chosen, transistor TR2 is cut off for approximately 0.83 millisecond which is the duration of a half cycle at a frequency of 600 cycles. Transistor TR1 is cut off for an interval having a duration of approximately 7.5 milliseconds. Thus the total period of the multivibrator, comprising one interval with TR1 cut off and an interval with TR2 cut off is equal to 8.33 milliseconds, which is one complete cycle at a frequency of 120 cycles per second. In FIG. 3, curve A shows the waveform at the collector electrode of transistor TR1, and curve B shows the waveform at the collector electrode of transistor TR2. Thus the signals at the collector electrodes have both 120-cycle-per-second and 600-cycle-per-second components.

The collector electrode of transistor TR2 is connected through a resistor R5, a capacitor C3, and the primary winding of a transformer T1 all in series of terminals 12. Capacitor C3 is used to block direct current, while resistor R5 and the primary winding of transformer T1 suppress higher harmonics and transients. Resistor R5 may have a value of 1,000 ohms, and capacitor C3 may have a value of 5 microfarads. The transformer T1 may be of standard design, such as Hammond type 44422. The waveform of the signal at the primary winding of transformer T1 is shown by curve C of FIG. 3.

The modulated signal in the primary winding of transformer T1 induces a signal in the center-tapped secondary winding, which is applied to the base electrodes of the transistors TR3 and TR4. These transistors are operated as a class B push-pull amplifier. The collector electrodes of these transistors are connected to opposite ends of the primary winding of an output transformer T2. In the emitter biasing circuit resistor R6 may have a value of 33 ohms, and resistors R7 and R8 may have values of 10 ohms each. The junction of these three resistors is connected to the ground terminal 12, while the junction point of resistor R6 and the center tap of the secondary winding of transformer T1 is connected through a dropping resistor R10 having a value of 9,100 ohms to the negative terminal of battery B. The center tap of the primary winding of transformer T2 is connected through a dropping resistor R11 having a value of 1,200 ohms to the negative terminal of battery B. The secondary winding of transformer T2 is connected through the various telephone exchange switching circuits to a line L which extends to a subscriber subset S.

The tone generator circuit can be switched on by a start signal, since it begins to operate at once; and can be switched off when not required. The start signal may be used for example to operate a relay 20 to close its contacts 21 and thereby supply ground to terminal 12.

When the subscriber at station S initiates a call by closing his hookswitch contacts HS, various switching circuits automatically operate in the exchange, and when the equipment is ready to receive dial pulses, an operate circuit will be completed for relay 20 through circuits not shown. The contacts 21 then close, causing the tone generator to start and to supply a signal from the output transformer T2, through the various switching circuits, out over line L to the substation S, where the signal flows through the receiver R. The modulated signal flowing through the signal R causes an audible tone to be produced which contains the 120-cycle-per-second and 600-cycle-per-second components. Upon hearing this dial tone, the subscriber may then proceed to dial. Referring again to FIG. 3, curve D shows the waveform in the secondary winding of transformer T2, and curve E shows the waveform of the output amplified and loaded by one telephone receiver.

It may be seen that the tone generator illustrated in FIG. 1 is much simpler and inexpensive than any of the electronic dial tone generators presently known in the telephone art. The unsymmetrical multivibrator is used in place of two or more oscillators and a modulating unit to obtain the same result, namely that of producing a tone containing both 120-cycle-per-second and 600-cycle-per-second components. Furthermore all of the component parts used are of a readily available inexpensive type.

Figure 2:
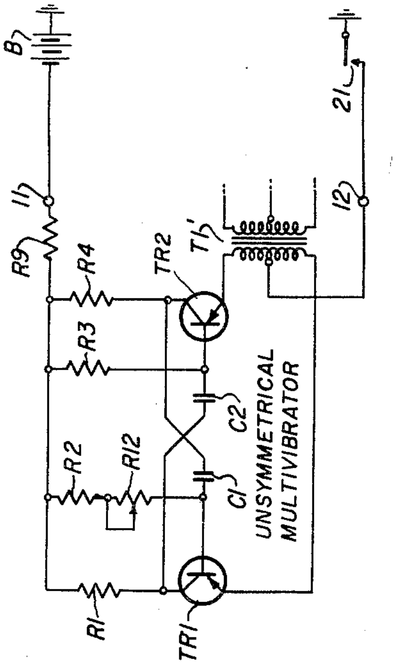
FIG. 2 is a schematic diagram of an alternative form of the multivibrator.
Figure 4:
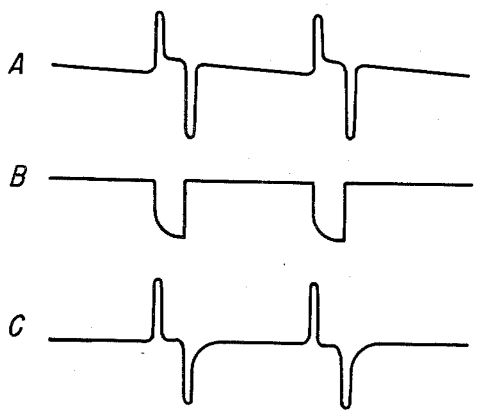

FIG. 2 is a schematic diagram showing an alternative embodiment of the arrangement for coupling the output of the multivibrator to the amplifier. If a special coupling transformer T1' is used, it may be connected with opposite ends of the primary winding connected to the emitter electrodes of transistor TR1 and TR2 respectively, with the center tap connected to terminal 12 and thence through contacts 21 to ground. In this case two component parts shown in FIG. 1, namely resistor R5 and capacitor C3, are eliminated. Referring to the graphs of FIG. 4, curve A shows the waveform at the base electrode of transistor TR1, curve B shows the wave form at the collector electrode of transistor TR1, and curve C shows the waveform of the output signal.

While I have described above the principles of my invention in connection with specific apparatus, it is to be clearly understood that this description is made only by way of example and not as a limitation to the scope of my invention.

What is claimed is:

1. An electronic tone generator for supplying a modulated tone signal over a telephone line to a telephone receiver; said generator comprising an unsymmetrical multivibrator which is the only frequency determining source, an amplifier, a transformer for coupling signal power from the multivibrator into the amplifier, and coupling means for coupling signal power from the amplifier to the telephone line; said multivibrator being astable with an operating period consisting of an interval in a first state and an interval in a second state of conduction, said period being equal in duration to one complete cycle of a first frequency, and the interval in the second state being equal in duration to one-half cycle of a second frequency; said multivibrator comprising a first amplifying device and a second amplifying device, each having an input, an output and a common electrode, first and second terminals for connection to opposite poles of a direct-current source, resistance means connecting the input and output electrodes of each amplifying device to the first terminal, connections from the common electrode of each amplifying device to the second terminal, a first capacitor coupling the input electrode of the first amplifying device to the output electrode of the second amplifying device, a second capacitor coupling the input electrode of the second amplifying device to the output electrode of the first amplifying device, with the product of the values of the resistance and capacitance of said circuit elements connected to the input electrode of the first amplifying device substantially different than the corresponding product for said circuit elements connected to the input electrode of the second amplifying device; so arranged that an audible tone modulated to contain both the first and the second frequencies is produced in the telephone receiver connected over the line to the tone generator.

2. A tone generator according to claim 1, wherein said amplifying devices are transistors, and said input, output and common electrodes are respectively the base, collector and emitter electrodes of the transistors.

3. A tone generator according to claim 2, wherein said transformer includes a primary winding for coupling to said multivibrator and a secondary winding for coupling to said amplifier, a resistor and capacitor connected in series between one end of the primary winding and the collector electrode of said second transistor, and a connection from the other end of the primary winding to the emitter electrode of the second transistor.

4. In combination with a tone generator according to claim 2, switching means for connecting said second terminal to the corresponding pole of the direct-current source and for connecting said second coupling means to said line responsive to a start signal.

References Cited in the file of this patent

UNITED STATES PATENTS

| | | |
|---|---|---|
| 2,674,734 | McCreary | Apr. 6, 1954 |
| 2,677,768 | Davison | May 4, 1954 |